Aug. 9, 1927.
W. T. SANDIFER
1,638,412
FLEXIBLE COUPLING
Filed June 29, 1925
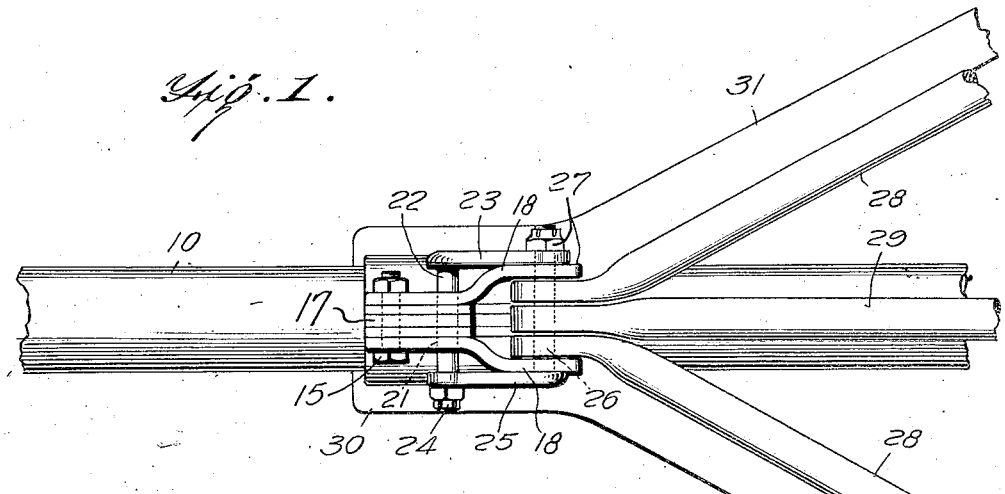
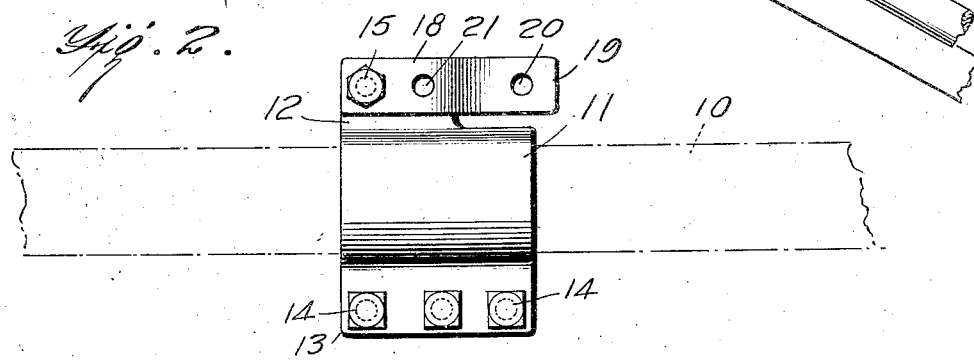
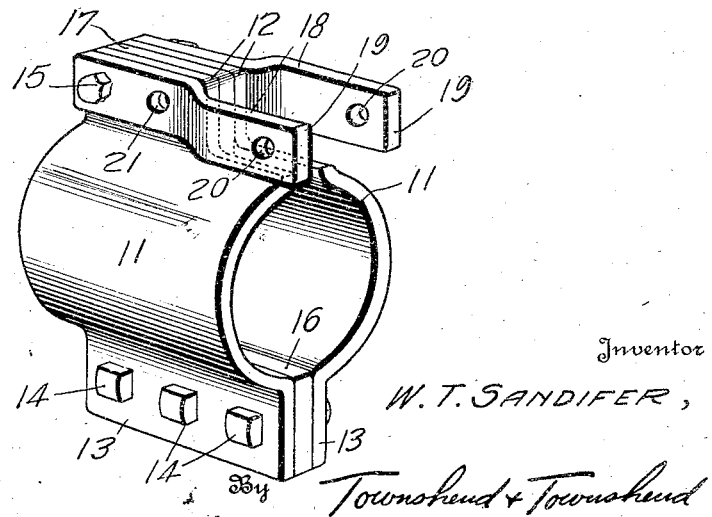
Inventor
W. T. SANDIFER,
By Townshend & Townshend
Attorneys Patented Aug. 9, 1927.

1,638,412

UNITED STATES PATENT OFFICE.

WILLIAM THOMAS SANDIFER, OF JACKSON, MISSISSIPPI.

FLEXIBLE COUPLING.

Application filed June 29, 1925. Serial No. 40,470.

My invention relates to couplings for land vehicles wherein a trailer is employed in connection with a tractor. The primary object is the provision of a flexible coupling for the connection of the trailer hounds to the coupling pole of a truck or tractor. Another object of the invention is the provision of a coupling of this character formed to permit free play of the trailer top brace while allowing flexibility of connection and preventing torsional strain. With these and such other objects in view as will be apparent from the description, the invention resides in the novel combination, construction and arrangement of parts hereinafter described and claimed and illustrated in the accompanying drawings, of which:—

Figure 1 is a top plan view of a portion of a truck coupling pole with the improved coupling applied thereon;

Figure 2 is a side elevation thereof;

Figure 3 is a perspective illustration of the coupling.

The invention is shown as applied to the coupling pole 10 of a truck or tractor and comprises a pair of semi-cylindrical plate castings 11 the side edges of which are provided with flat wing flanges 12 and 13 respectively. The side plates 11 may be adapted to be disposed at opposite sides of the coupling pole 10 being secured together by means of the securing bolts 14 passed through the lower flanges 13 and a coupling bolt 15 passed through the forward end of the upper flanges 12. Spacer plates 16 and 17 are disposed between the flanges 12 and 13.

Each of the upper edge flanges 12 on the side plates 11 extends only half way between the ends of the coupling to provide a clearance at the rear end of the coupling for the purpose to be hereinafter explained. Secured at one end to the coupling bolt 15 and disposed on opposite sides of the top flanges 12 in parallel relation thereto, is a pair of iron straps 18 which are offset intermediate their ends at the point of termination of the flanges 12, to provide outwardly flared spaced arms 19 provided with transverse bores 20 extending therethrough in alinement.

Intermediate the point of connection with the bolt 15 and the offset portion, each of the straps 18 is provided with a transverse bore 21 adapted to register with apertures (not shown) provided in the ears 12 and filler plate 17. The bores 21 are adapted to receive therethrough the stem 22 of an L-shaped casting one arm of which comprises the stem 22 and the other of which is formed in a strap 23 extending at a right angle therefrom and parallel with one arm 19 of a strap 18. The strap 23 extends from one end of the stem 22, the opposite end being formed for reception of the securing nut 24 thereover, which nut bears against the outer face of an apertured end of a strap 25 similar in construction to the strap 23 and carrying at its opposite end a stem 26 passed through the bores 20 in the arms 19 and through the apertured end of the strap 23, being retained by means of the securing nut 27.

The flexible hounds 28 and 29 of the trailer top brace converge at a given point, their ends being provided with ears pivotally engaged over the stem 26 which is passed therethrough, the ends of the hounds 28 and 29 being engaged over the stem 26 between the spaced arms 19 of the straps 18 and in the cleared space provided by the cutting away of the side plate flanges 12 and filler plates 17.

At the under side of the coupling, the forward ends 30 of two converging arms 31 which are connected with a trailer axle at their rear ends (not shown), are attached in any suitable manner to the lower flanges 13 of the side plates, so that side movement or turning of the side plates 11 upon the coupling pole 10 is prevented. With the coupling attached as illustrated in Figures 1 and 2, it will be apparent that the flexible hounds 28 and 29 of the trailer top brace are pivotally connected to the coupling over the stem 26 so that free play may be had insuring a flexibility of the coupling.

While in this preferred embodiment of the invention I have illustrated and described certain details and materials entering into the construction and operation thereof, I desire it to be understood that the invention is not to be limited thereby but that any desired changes and modifications may be made in the structural details as will fall within the scope of the invention as claimed.

I claim:—

1. A flexible trailer coupling comprising a pair of side plates adapted to be secured on a coupling pole, flanges formed on the edges of said plates, spaced arms arranged on said flanges and extending in parallel relation from said plates, and a pivot member extending between the spaced ends of said arms for pivotal connection with the top brace hounds of a trailer.

2. A flexible trailer coupling comprising a member adapted to be secured on a coupling pole, means carried by said member beneath the pole for anchoring engagement with a fixed brace of a trailer for preventing rotation of said member on the pole, and means carried by said member above said pole for pivotal connection with the top brace hounds of the trailer.

3. A flexible trailer coupling comprising a pair of semi-cylindrical plates provided with flat lateral edge flanges and adapted to be secured on a tractor coupling pole with said flanges disposed in parallel relation above and below the pole, rearwardly extending straps connected to the uppermost flanges, said straps being offset intermediate their ends to provide spaced arms, a pivot stem disposed through the ends of said spaced arms for pivotal reception thereover of the forward ends of the top brace arms of a trailer, and means for securing said stem to said arms as a unit.

4. A flexible trailer coupling comprising a pair of semi-cylindrical side plates provided with parallel edge flanges and adapted to be secured on a tractor coupling pole with said flanges disposed above and below the pole, anchored connection between the lowermost flanges and the forward end of a fixed brace of a trailer for preventing rotation of said coupling about the pole, and pivotal connecting means carried by the uppermost flanges for engagement with the hounds of a trailer top brace.

In testimony whereof I have affixed my signature.

WILLIAM THOMAS SANDIFER.